United States Patent
Hooli et al.

(10) Patent No.: US 7,991,084 B2
(45) Date of Patent: Aug. 2, 2011

(54) APPARATUS, METHOD AND COMPUTER PROGRAM PRODUCT FOR DETECTING NON-SYNCHRONIZED RANDOM ACCESS CHANNEL PREAMBLE

(75) Inventors: Kari Hooli, Oulu (FI); Juha Sakari Korhonen, Espoo (FI); Kari Pajukoski, Oulu (FI); Esa Tiirola, Kempele (FI)

(73) Assignee: Nokia Corporation, Espoo (FI)

( * ) Notice: Subject to any disclaimer, the term of this patent is extended or adjusted under 35 U.S.C. 154(b) by 757 days.

(21) Appl. No.: 12/008,290

(22) Filed: Jan. 10, 2008

(65) Prior Publication Data

US 2008/0165903 A1    Jul. 10, 2008

Related U.S. Application Data

(60) Provisional application No. 60/879,872, filed on Jan. 10, 2007.

(51) Int. Cl.
*H03D 1/00* (2006.01)
(52) U.S. Cl. ......................... 375/343; 375/325
(58) Field of Classification Search .................. 375/260, 375/343, 340, 325; 370/336
See application file for complete search history.

(56) References Cited

U.S. PATENT DOCUMENTS

| | | | |
|---|---|---|---|
| 7,113,538 B1 | 9/2006 | Chen et al. | 375/150 |
| 2008/0101306 A1* | 5/2008 | Bertrand et al. | 370/336 |
| 2010/0182979 A1* | 7/2010 | Malladi et al. | 370/336 |

FOREIGN PATENT DOCUMENTS

EP    1 178 638 A1    2/2002

OTHER PUBLICATIONS

3GPP TSG RAN WG1 #47, R1-063214, XP-002481493, "Non Synchronized Random Access Design for High Doppler Conditions", Nov. 6-10, 2006, Riga, Latvia, 7 pgs.
"Non Synchronized Random Access Design for High Doppler Conditions", Riga, Latvia, 3GPP TSG RAN WG1 #47, Nov. 6-10, 2006, pp. 1-7.

* cited by examiner

*Primary Examiner* — Emmanuel Bayard
(74) *Attorney, Agent, or Firm* — Harrington & Smith

(57) ABSTRACT

A detect decision is made by non-coherently combining results from correlating a preamble (CAZAC) sequence with base/root sequences used in the cell and setting a detection threshold based on those combined results. Another threshold can be set based on coherently combining results from correlating the preamble sequence, in which case the detect decision is based on satisfying either one of the thresholds. Where the sequence repeats in the same preamble, the results that are combined are from correlating the first instance of the CAZAC sequence and from correlating the second instance of the CAZAC sequence. Where the sequence does not repeat, different segments of the CAZAC sequence, each less than the whole and not necessarily of the same length, are correlated for a partial correlation on each segment, then the segments are combined and used to set the detection threshold. Detection may be done in stages, adjusting the threshold after the first stage based on comparing the results of non-coherent and coherent combining.

26 Claims, 7 Drawing Sheets

US 7,991,084 B2

APPARATUS, METHOD AND COMPUTER PROGRAM PRODUCT FOR DETECTING NON-SYNCHRONIZED RANDOM ACCESS CHANNEL PREAMBLE

PRIORITY CLAIM

This patent application claims priority under 35 U.S.C. §119(e) from Provisional Patent Application No. 60/879,872, filed Jan. 10, 2007, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques for detecting a preamble of a random access channel, such as a preamble bearing (Zadoff-Chu or ZC) CAZAC sequence.

BACKGROUND

A proposed communication system known as evolved universal terrestrial radio access network (E-UTRAN, also referred to as UTRAN-LTE or 3.9G) is currently under discussion within the 3GPP. The current working assumption is that the downlink DL access technique will be orthogonal frequency division multiple access OFDMA, and the uplink UL technique will be single-carrier frequency division multiple access SC-FDMA.

Reference can be made to 3GPP TR 25.814, V7.0.0 (2006-06), 3rd Generation Partnership Project; Technical Specification Group Radio Access Network; Physical layer aspects for evolved Universal Terrestrial Radio Access (UTRA) (Release 7), such as generally in section 9.1 for a description of the SC-FDMA UL of UTRAN-LTE.

This invention relates to the UL part of the UTRAN-LTE, specifically to the detection of a non-synchronized random access channel RACH preamble. As will be seen, two competing concerns with RACH preamble detection are missed detection and false alarms.

As is described in Section 9.1 of 3GPP TR 25.814, the basic uplink transmission scheme is single-carrier transmission (SC-FDMA) with cyclic prefix to achieve uplink inter-user orthogonality and to enable efficient frequency-domain equalization at the receiver side. Frequency-domain generation of the signal, sometimes known as discrete Fourier transform DFT-spread OFDM (DFT S-OFDM), allows for a relatively high degree of commonality with the DL OFDM scheme and the same parameters, e.g., clock frequency, can be reused.

In 3GPP there has been extensive discussions related to the non-synchronized RACH preamble structure. A constant-amplitude zero autocorrelation (CAZAC) sequence, specifically a Zadoff-Chu sequence, has been agreed to be the preamble sequence for LTE UL. Its ideal periodic autocorrelation properties have been seen as beneficial for a RACH preamble, for example, multiple preambles are obtained from a single base Zadoff-Chu sequence with cyclic shifts of the sequence. Zadoff-Chu sequences of odd length are given by $$a_u(k) = \exp\left(-j2\pi u \frac{qk + (k^2 + k)/2}{N_G}\right),$$

where k is the sample index, q is an integer and u is the sequence index that defines the base sequence, and $N_G$ is the length of the Zadoff-Chu CAZAC sequence. Generally, $N_G$ and u are restricted to be co-primes. In the following, $$a_{u,d}(k) = a_u(k - d \bmod N_G)$$

refers to the $d^{th}$ cyclic shift of sequence $a_u$.

The current working assumptions in 3GPP are that the RACH preamble is transmitted on a 1.08 MHz bandwidth, 64 preambles are used in each cell, and total duration of the preamble is 0.8 ms, excluding any cyclic prefix CP and guard time. In 3GPP-LTE, it is expected that the preamble will include a single 0.8 ms Zadoff-Chu sequence or a 0.8 ms Zadoff-Chu sequence repeated twice. The repeating ZC sequence is to improve RACH coverage. A repetition of a 0.4 ms Zadoff-Chu sequence was also considered in 3GPP. In the following, the duration of the Zadoff-Chu sequence is marked with Ts. Preambles with single and repeating ZC sequences are shown respectively at FIGS. 2A and 2B.

Alternative ways of generating the single carrier preamble signal are shown by the process blocks of FIGS. 2C-E. FIG. 2C shows time domain processing and FIGS. 2D-2E show frequency domain processing, which are seen as more likely to be adopted in UTRAN-LTE. The processing in FIG. 2D is in accordance with the DFT-S-OFDMA system used for transmission on the scheduled resources, while FIG. 2E simplifies processing compared with FIG. 2D. The filtering-blocks in FIGS. 2D-2E may or may not be included. In each of FIGS. 2C-E, the ZC sequence is generated 201, the cyclically shifted 202 before a cyclic prefix is inserted 203. FIG. 2C follows CP insertion by channel filtering 204 prior to transmitting 205. In FIG. 2D, a discrete Fourier transform DFT is executed 206 on the cyclically shifted ZC sequence, the DFT results are filtered 207, and mapped 208 to the subcarriers. Prior to CP insertion 203, an inverse DFT is executed 209 where the subcarriers are spaced, and then the SP is inserted 203 prior to transmission 205. FIG. 2E differs from FIG. 2D in that there is no DFT 206, and the cyclic shifting 202 takes place after the IDFT block 209.

It has been noted that the correlation properties of Zadoff-Chu sequence deteriorates significantly with a large frequency offset between the user equipment UE and the Node B (e.g., base station BS) transceivers. When correlating the received, frequency shifted signal with a replica of the transmitted ZC sequence, there also appear side correlation peaks which can be even larger than the main correlation peak. The relative location of the side correlation peaks depends on the sequence index u. Cyclic shifts of a Zadoff-Chu sequence are used in different preambles, but the false detection rate or false alarm rate increases with increasing frequency offset between those different preambles. (A false alarm is considered to be where a preamble transmission triggers detection of also another preamble.) The main correlation peak also diminishes with increasing frequency offset, which increases the probability of a missed detection.

The problems in the preamble detections due to frequency offset from the sequence used in other preambles can also be summarized as follows:

$N_G$ cyclic shifts of a Zadoff-Chu sequence can be seen as an orthogonal base of $N_G$-dimensional space.

A frequency offset of $1/T_s$ rotates the transmitted sequence from the original direction to the direction of another cyclic shift B. As a result, the received sequence is orthogonal with the transmitted one. The cyclic shift B depends on the sign of the frequency offset as well as on the u-index of the sequence.

When frequency offset is less than $1/T_s$, the rotation is not restricted to the plane defined by the original sequence and the cyclic shift B. However, the largest components of the rotation are along these directions.

A specific preamble mode, restricted sets of cyclic shifts, where the cyclic shifts used as preambles are selected according to suitable constraints is introduced in 3GPP as a solution to this sensitivity to frequency offset. Details in this regard can be seen at co-owned application PCT/IB2007/004134, filed on Dec. 2, 2007 and entitled "Apparatus, methods and Computer Program Products providing Limited Use of ZAD-OFF-CHU Sequences in Pilot or Preamble Signals". In the following, we consider the detection of preambles from unrestricted sets of cyclic shifts.

In view of FIGS. 2A-2B, there are then two distinct cases. For brevity, we term repeating a Zadoff-Chu sequence in a preamble as case 1; and we term combining partial correlations of a Zadoff-Chu sequence that is not repeated in a preamble as case 2.

Consider case 1. The coherent and non-coherent combining of the repeated sequence correlations are obvious methods. The benefits of coherent combining over non-coherent combining include:

Better detection probability at low SNR (Ep/No) for low velocity terminals, and

Less false alarms due to high velocity terminals.

The drawback is

High missed detection probability for high velocity terminals.

High velocity terminals are a distinct concern because the Doppler effect between a fast-moving UE and a BS affect the frequency at which a CAZAC sequence preamble is received, and therefore its frequency offset. As would be expected, the benefit of non-coherent combining as compared to coherent combining is the opposite, to whit:

Better detection probability for high velocity terminals; and the drawback is

High false alarm rate due to high velocity terminals.

With a minor amount of increased computational complexity, both coherent and non-coherent combinations can be calculated and further combined with selection or soft combining. This approach is evident in a paper sourced to Texas Instruments entitled: "3GPP TSG RAN WG1 #47, Riga, Latvia, Nov. 6-10, 2006; Non Synchronized Random Access Design for High Doppler Conditions". The method described there achieves good detection probabilities for both high and low velocity terminals. The false alarm properties depend on the used soft combining method, but relatively high false alarm rates are expected. This is the case at least for hard combining.

For case 2, partial correlation of a single (long) sequence and non-coherent combination of these partial correlations is well-known in the art as a general proposition.

What is needed in the art is a way to reduce rates/probabilities for both false alarms and missed detections. Preferably, such an approach would show improvements where the preamble has a single CAZAC sequence and a repeated CAZAC sequence. It is noted that the invention is not limited to 3.9G systems, generalized CAZAC or more specific Zadoff-Chu sequences; those are used as non-limiting examples to illustrate the inventive detection techniques and apparatus.

SUMMARY

According to an embodiment of the invention is a method that includes non-coherently combining results from correlating a received preamble sequence with root sequences in use in a cell, then setting a detection threshold based on the non-coherently combined results and comparing correlation peaks from the correlating to the detection threshold. A preamble sequence is detected as using the root sequence whose correlation peak exceeds the detection threshold.

According to another embodiment of the invention is a memory embodying a program of machine-readable instructions executable by a digital data processor to perform actions directed toward detecting a preamble sequence. In this embodiment the actions include non-coherently combining results from correlating a received preamble sequence with root sequences in use in a cell, setting a detection threshold based on the non-coherently combined results, comparing correlation peaks from the correlating to the detection threshold, and detecting the preamble sequence using the root sequence whose correlation peak exceeds the detection threshold.

According to another embodiment of the invention is an apparatus that includes circuitry that is configured to non-coherently combine results from correlating a received preamble sequence with root sequences in use in a cell. The apparatus also includes a processor that is adapted to set a detection threshold based on the non-coherently combined results and to compare correlation peaks from the correlating to the detection threshold. Further, the apparatus includes a decision block that is configured to detect the preamble sequence using the root sequence whose correlation peak exceeds the detection threshold.

According to another embodiment of the invention is an apparatus that includes combining means for non-coherently combining results from correlating a received preamble sequence with root sequences in use in a cell, generating means for setting a detection threshold based on the combined results, comparing means for comparing correlation peaks from the correlating to the detection threshold, and detecting means for detecting a preamble sequence using the root sequence whose correlation peak exceeds the detection threshold.

In a particular embodiment of the apparatus described immediately above, there are also means for storing the u root sequences such a local computer readable memory, and means for receiving the preamble sequence such as a wireless receiver, and means for correlating is the received preamble sequence with each of the stored u root sequences, and this means for correlating may be a multiplier block adapted to multiply a discrete Fourier transform DFT by a conjugate of a DFT of the preamble sequence. In this particular embodiment the combining means is a non-coherent combiner block, the generating means is threshold control logic, the comparing means includes a peak detector, and the detecting means is a decision device that outputs a hard detect decision to base station control logic.

These and other aspects are detailed with particularity below.

DETAILED DESCRIPTION

Embodiments of this invention relate to combining correlation results for preamble sequences for i) repeated sequences; ii) partial correlations of a single sequence, and iii) utilization of particular, sequence specific cyclic shifts on the preamble detection. Specific aspects of the invention include:

Detection in stages, where a first stage provides tentative peak detections and a subsequent second stage provides final peak detections;

Correlation results of repeated sequences, or of partial correlation results of a single sequence, are combined both coherently or non-coherently to produce two sets of correlation results;

Detection thresholds in the second stage are adjusted based on the peak correlation values of tentative detections; and The use of correlation results of cyclic shifts that correspond to frequency offsets of $\pm 1/T_s$ in the threshold adjustment and in removing false correlation peaks.

The exemplary embodiments of this invention take place in a receiver that receives a message bearing the preamble, and provide a technique to detect the CAZAC sequence in that preamble by correlating that sequence with the received signal. When a preamble is detected, the base station transmits on downlink a random access response corresponding to the detected preamble. The response may include a timing advance parameter for correcting the transmission timing of the user equipment. The base station obtains the timing advance value from the measured delay of the preamble. Since it is anticipated that UTRAN-LTE will use up to 64 preambles in a cell, multiple ZC base (or root) sequences are used to obtain a sufficient number of preambles. So correlating as used herein refers to correlating the sequence received in the preamble with itself as well as with other base sequences. As will be seen below, the received ZC sequence is correlated with ZC root sequences, indexed with u as above.

Figure 1:
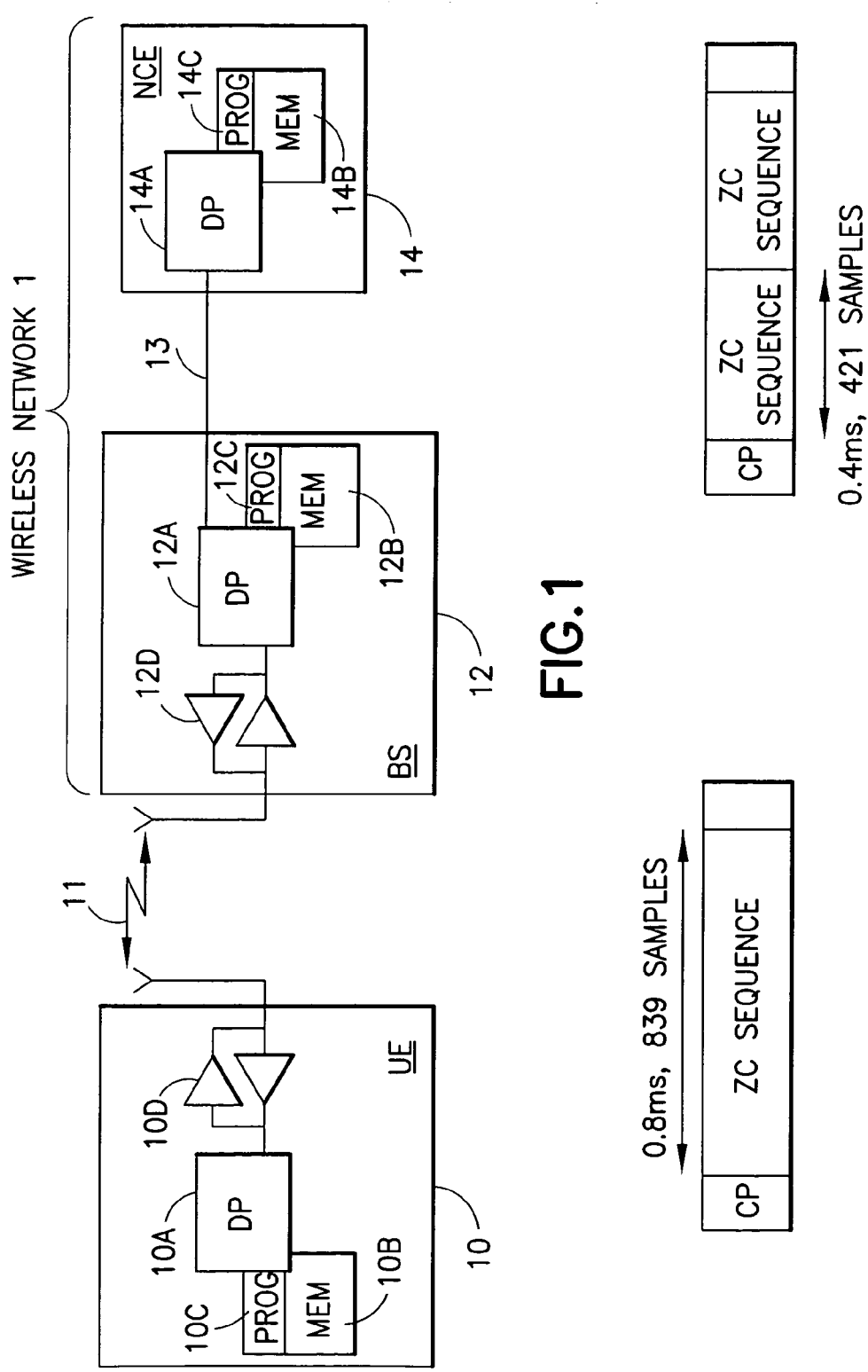
FIG. 1 is a simplified block diagram of various electronic devices that are suitable for use in practicing the exemplary embodiments of this invention.

Before further describing the exemplary embodiments of this invention reference is made to FIG. 1 for illustrating a simplified block diagram of various electronic devices that are suitable for use in practicing the exemplary embodiments of this invention. In FIG. 1 a wireless network 1 is adapted for communication over a wireless link 11 with a user equipment UE 10 via at least one base station BS 12 (e.g., Node B). The network 1 in this non-limiting case is assumed to be a mobile wireless UTRAN-LTE communication network, and may include a network control element (NCE) 14 (e.g., a radio network controller RNC) coupled to the BS 12 via a data link 13. The UE 10 includes a data processor (DP) 10A, a memory (MEM) 10B that stores a program (PROG) 10C, and a suitable radio frequency (RF) transceiver 10D for bidirectional wireless communications with the BS 12, which also includes a DP 12A, a MEM 12B that stores a PROG 12C, and a suitable RF transceiver 12D. The NCE 14 that also includes at least one DP 14A and a MEM 14B storing an associated PROG 14C. The PROGs 10C and 12C are assumed to include program instructions that, when executed by the associated DP, enable the electronic device to operate in accordance with the exemplary embodiments of this invention, as will be discussed below in greater detail.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 12A of the BSs 12 and 12' in cooperation with the DP 10A of the UE 10, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Consistent with the Background description, two distinct preambles are considered, termed case 1 for a preamble with a repeated CAZAC sequence, and case 2 for a preamble with a single CAZAC sequence.

Case 1

In this case, embodiments use both coherently and non-coherently combined correlation results for repeated sequence.

In general, the preamble detection threshold is adjusted according to the peak values of non-coherently combined correlation results, or according to both coherently and non-coherently combined correlation results. The detection threshold is adjusted individually to each Zadoff-Chu base sequence (the u-index of the equation in the background section) that is used to detect the subject preamble. Therefore, the threshold is the same for all preambles derived from a given Zadoff-Chu sequence with cyclic shifts. The two methods detailed below can be used independently or jointly. For case 1, the repeating ZC sequence is distinguished as first and second instance of the ZC code to distinguish them from one another in the below description. Embodiment 1 is shown in FIG. 4.

Embodiment 1

Figure 4:
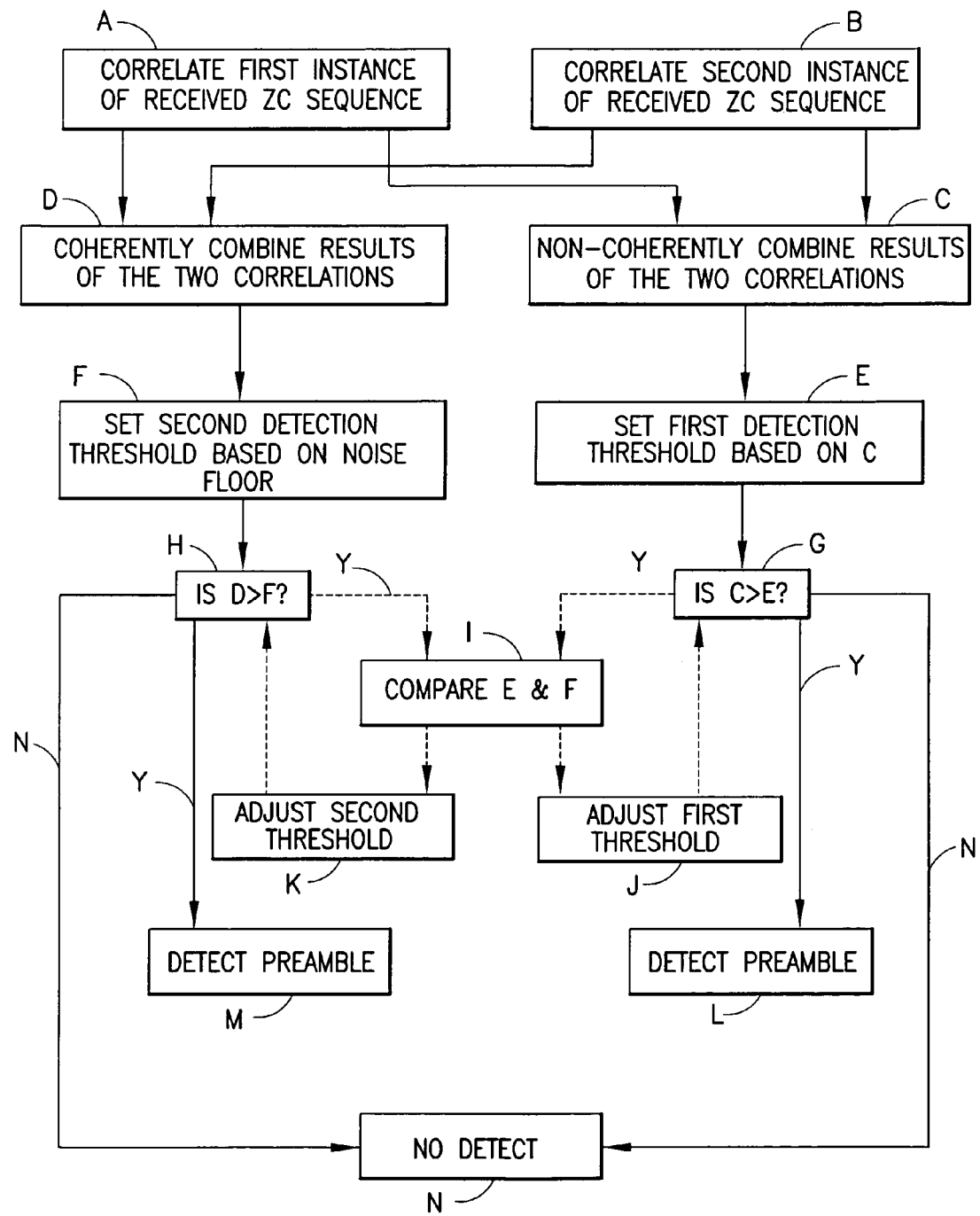
FIG. 4 is a flow diagram showing process steps for an embodiment of the invention, detailed below as methods 1 and 2.

Each instance of the received ZC code is correlated with one of the ZC root/base sequences (indexed by u) used in the cell at blocks A and B of FIG. 4. These two correlation results are non-coherently combined at block C. The strongest peak $P_{nc,u}$ from the non-coherently combined results is selected for that $u^{th}$ Zadoff-Chu base sequence. The detection threshold for the non-coherently combined results is set at block E, such as to be a maximum of ($aP_{nc,u}$, $T_{n,nc}$), where a<1 and $T_{n,nc}$ is the threshold set by the noise floor. Call this the first threshold. If the non-coherently combined results exceed this first threshold at block G, then the decision is made at block L that a preamble is detected for this $u^{th}$ ZC base sequence. Otherwise, it is decided at block N that a preamble is not detected for this uh ZC base sequence. This is repeated for each of the ZC base sequences in use in the cell. If any of the $u^{th}$ strongest peaks exceeds the detection threshold set based on that $u^{th}$ base sequence, then the receiver continues to estimate the timing of the received preamble and to generate random access response message corresponding to the detected preamble. If none, then the receiver determines that no preamble was sent, since none of the u ZC sequences in use in its cell meet the detection threshold. It is noted that the blocks of FIG. 4 and the above description are functional; actual implementations may find it advantageous to correlate both instances of the received ZC sequence with each of the u ZC sequences in use in the cell, store all of those results, and compare the various results for each $u^{th}$ ZC sequence sequentially or in parallel to the detection threshold for the respective $u^{th}$ ZC sequence.

In a variation of the description above, and describing for only one of the u ZC sequences in use in the cell, the correlation results for the uth ZC sequence may also be, coherently combined at block D. The threshold $T_{n,c}$ set by the noise floor is used for the coherently combined results. Call this the second threshold at block F of FIG. 4, and note that the threshold for the coherently combined results does not depend on the $u^{th}$ ZC sequence. A decision is made that a preamble is detected if the non-coherently combined results exceed the first threshold (block L) or the coherently combined results exceed the second threshold (block M). This is repeated for each of the u ZC base sequences until all of the u base sequences in use in the cell have been evaluated.

Embodiment 2

In this embodiment, the preamble detection is done in a staged manner. FIG. 4 shows these additional steps in dotted lines. Each instance of the received ZC code is correlated with the ZC root/base sequences (indexed by u) used in the cell at blocks A and B, as above. These correlation results are non-coherently and coherently combined at respective blocks D and C. In a first stage, tentative soft detections are done for both the non-coherently combined results and the coherently combined results. This is shown as blocks H and G of FIG. 4 as above, but this represents only the first stage. In a second stage following the first stage, the base-sequence specific threshold is adjusted based on a comparison at block I of non-coherent & coherent soft detection values from blocks E and F that are output from blocks H and G. The detection threshold is adjusted at least for the non-coherent combinations at block J, but may also be adjusted also for the coherent combinations at block K. A hard decision is then made upon the re-entry into block G (and block H if used). Assuming both non-coherent and coherent second stage decision is used, the decision is made that a preamble is detected if either the coherently combined correlation peak exceeds its adjusted threshold at the re-entry to block G, or the non-coherently combined correlation peak exceeds its adjusted threshold at the re-entry of block H.

The embodiment 2 aspect of the invention may be implemented as follows. First, correlate the two instances of the Zadoff-Chu sequence in the preamble of the received signal with the ZC root/base sequences (indexed by u) used in the cell. Next, estimate the level for noise and interference.

For the first stage:
coherently combine correlation results over repeated sequences
non-coherently combine correlation results over multiple transmit antennas
tentatively detect peaks which exceed threshold $T_{n,c}$ set up against noise floor
non-coherently combine correlation results over repeated sequences
non-coherently combine correlation results over multiple transmit antennas
tentatively detect peaks which exceed threshold $T_{n,nc}$ set up against noise floor For the second stage:
Find detected peaks for which non-coherently combined results are larger than coherently combined ones. Go through such preambles one-by-one starting from the strongest peak and performing following steps:
Tentatively detect multi-path peaks and respective delays
Calculate average value β for ratio (non-coherently combined−coherently combined)/(non-coherently combined) over the detected multi-path peaks.
Calculate a candidate threshold $\mu\beta(P-T_{n,nc})+T_{n,nc}$ where μ<1 is a constant parameter and P is the strongest peak for that preamble.
Select the candidate threshold as the threshold if it is larger than the previous one. Remove such peak detections that do not exceed new threshold from the loop.
A preamble is detected if the threshold for non-coherently or coherently combined result is exceeded.

If embodiments 1 and 2 above are combined, the variable a can be adjusted in the second detection stage or, alternatively, a maximum threshold may be defined by embodiment 1.

Case 2

This relates to a single instance of a CAZAC code in a preamble. Correlation over that longer preamble sequence is done in multiple shorter sequence pieces. Term these each a partial correlation, which means correlation across less than the entire discrete sequence present in the preamble. [It is noted that these embodiments of case 2 can be extended to the detection of the repeated ZC sequences of case 1 where each shorter sequence is correlated in multiple shorter pieces.] The impact of partial correlation can be seen as a transformation that rotates the original signal. When the length of a partial correlation is $T_s/2$, the main components of the transformed sequence are along the directions of the original sequence Embodiment 3

This variation is similar to the description for the staged decisions of Case 1 above, except instead of correlating the different received instances of the same ZC code, different segments of the single ZC code are correlated with the ZC root/base sequences used in the cell, each yielding a partial correlation. There are then two correlated segments of the received single ZC code. In this approach:
the partial correlations are combined both coherently and non-coherently, resulting in two parallel correlation results, tentatively detected peaks from both correlation results are
used to make final preamble detection decisions, and
the preamble detection thresholds are adjusted according
the peak values of non-coherently combined correlation
results, or according to both coherently and non-coherently combined correlation results.

The detection thresholds are adjusted individually to each
Zadoff-Chu base sequence (u-index) used in preambles. In
other words, the thresholds are the same for all preambles
derived from a given Zadoff-Chu sequence with cyclic shifts.
Different thresholds are used for coherently and non-coherently combined correlation results Additional features of this aspect of the invention, different
than the Case 1 approach, are related to the calculation of
partial correlations and aim to the reduction of false correlation peaks induced by partial correlation:

Partial correlations can be done in parallel for sequence
pieces of different lengths. In other words, partial correlations are calculated, e.g., both in 2 pieces (2×0.4 ms)
and 3 pieces (3×0.27 ms). These partial correlations are
non-coherently and non-linearly combined producing
the non-coherently combined correlation results noted
above.

Windowing can be applied to smooth the beginning and
ending of the correlation time window for the partial
correlations that are non-coherently combined.

One implementation of embodiment 3 is as follows. Correlate the received signal with Zadoff-Chu sequences in multiple pieces or segments (e.g. 2 segments), and then estimate
the level for noise and interference in the received signal.

For the first stage:
coherently combine the partial correlation results
non-coherently combine the correlation results over multiple transmit antennas
tentatively detect peaks which exceed the threshold $T_{n,c}$ set
up against the noise floor
non-coherently combine the partial correlation results
non-coherently combine the correlation results over multiple transmit antennas
tentatively detect peaks which exceed the threshold $T_{n,nc}$
set up against the noise floor For the second stage:
Find detected peaks for which non-coherently combined
results are larger than the coherently combined results.
Go through such preambles peak-by-peak starting from
the strongest peak and performing the following steps:
Tentatively detect multi-path peaks and respective
delays
Calculate an average value β for the ratio [(non-coherently combined−coherently combined)/(non-coherently combined)] over the detected multi-path peaks.
If β<α, where a is a predetermined parameter:
Calculate a candidate threshold $\mu\beta(P-T_{n,c})+T_{n,c}$
where μ<1 is a constant parameter and P is the
strongest peak for that preamble.
Select the candidate threshold as the threshold if it is
larger than the previous one.
If β>α, then remove the tentatively detected peaks from
both coherently and non-coherently combined
results, and execute the above steps on the next peak.
Apply a new threshold for the coherently combined correlation results and remove such tentative detections that
do not exceed the new threshold.
A preamble is detected if the threshold for the non-coherently combined result or for the coherently combined
result is exceeded.

Embodiment 4

This embodiment introduces cyclic shifts. The impact of
partial correlation can be seen as a transformation that rotates
the original signal. When the length of partial correlation is
$T_s/2$, the main components of the transformed sequence are
along the directions of the original sequence and on the cyclic
shifts corresponding to the $\pm 1/T_s$ frequency offsets.

Figure 2:
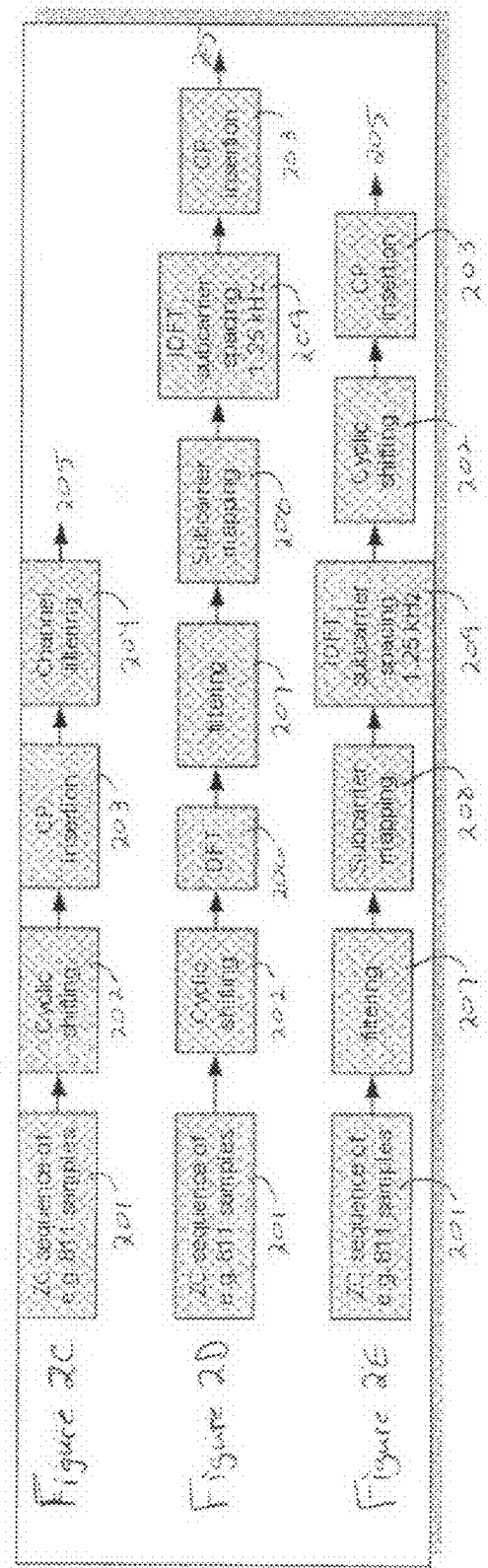
FIG. 2A is a schematic diagram of a message preamble with a cyclic prefix, a single ZC sequence and a trailing guard interval.
FIG. 2B is similar to FIG. 2A, but where the preamble includes a repeated ZC code instead of a single ZC code.
FIGS. 2C-E illustrates a time domain (FIG. 2C) and two frequency domain (FIGS. 2D-2E) implementations of the preamble generation.

The cyclic shifts of $a_{u,d}(k)$ that correspond to the $\pm 1/T_s$
frequency offsets are $a_{u,(d+c_{off} mod N_G)}(k)$ and $a_{u,(d-c_{off} mod N_G)}(k)$,
respectively. If the transmission is according to FIG. 2C or
2D, the cyclic shift offset is given by $c_{off}=(N_G m-1)/u$, where
m is the smallest positive integer for which $c_{off}$ is an integer.
On the other hand, if the transmission is according to FIG. 2E,
the cyclic shift offset $c_{off}=u$. In the case of FIG. 2E, $a_u(k)=$
$IDFT(A_u(n))$. where $IDFT( )$ is the inverse discrete Fourier
transformation, and $$A_u(n) = \exp\left(-j2\pi u \frac{qn + (n^2+n)/2}{N_G}\right).$$

In the following, we denote $\{a_{u,(d-c_{off} mod N_G)}(k), a_{u,d}(k), a_{u,(d+c_{off} mod N_G)}(k)\}$ as a cyclic shift triplet of $a_{u,d}(k)$. We refer to
$\{a_{u,(d-c_{off} mod N_G)}(k), a_{u,(d+c_{off} mod N_G)}(k)\}$ as a frequency cyclic
shift pair of $a_{u,d}(k)$ since they are equal up to a phase rotation
with the frequency domain cyclic shift of $+/-1$ of $a_{u,d}(k)$. A
frequency cyclic shift means that a cyclic shift is performed
on the frequency domain presentation of a sequence.

Figure 5:
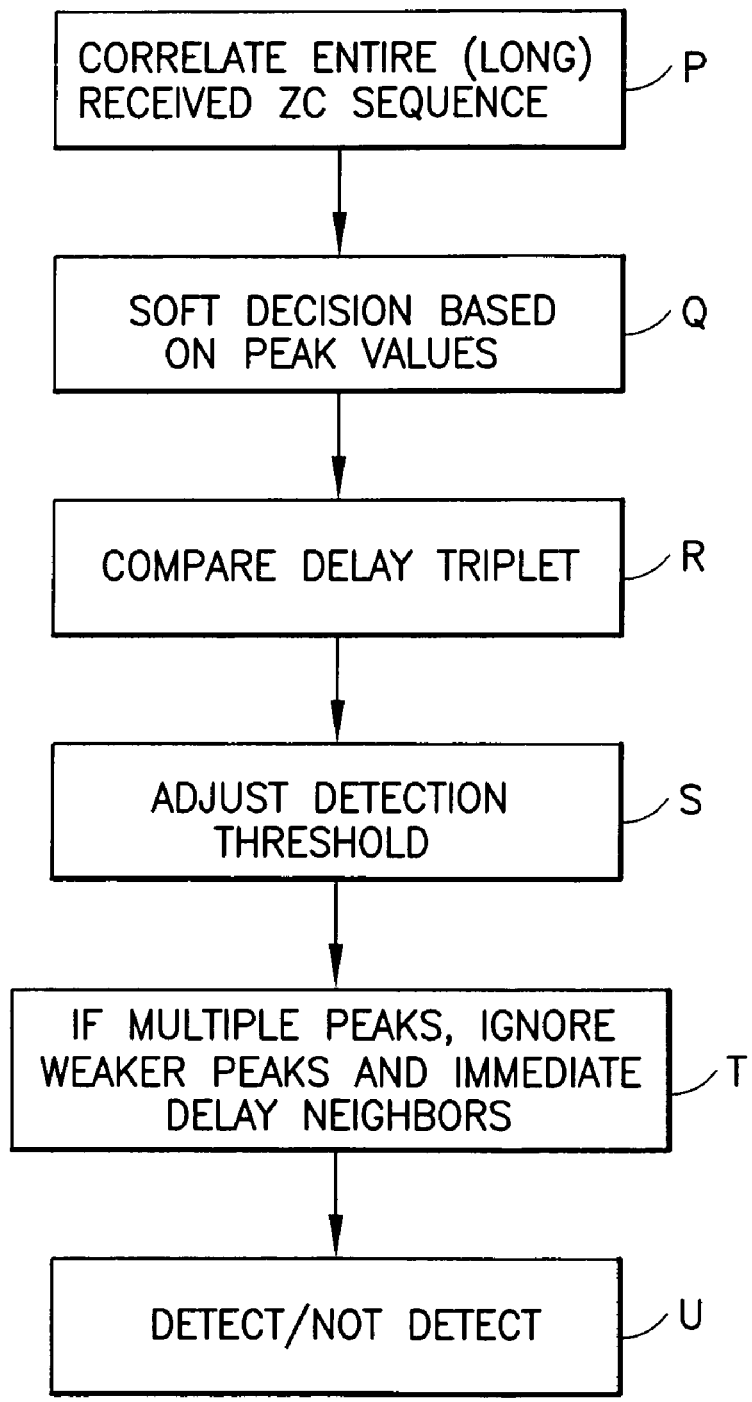
FIG. 5 is a flow diagram showing process steps for another embodiment of the invention, detailed below was method 4.

In this aspect of the invention, shown in FIG. 5, correlation
is done over the whole sequence. At block P, the entire ZC
sequence is correlated with the ZC root/base sequences used
in the cell.

Tentative detections are made at block Q based on the
correlation peak values.
Soft values of the tentatively detected peaks are then compared at block R to two correlation values that are on
particular cyclic shift (delay) offsets to the detected
peak, that is, on s frequency cyclic shift pair of the
detected peak. In the following, these three delays are
referred to as a cyclic shift triplet.
Based on the comparison:
The detection threshold is adjusted at block S.
If multiple peaks are detected on the delay triplet at
block T, weaker peaks on the delay triplet and on
immediate delay neighborhood are rejected. The
immediate delay neighborhood is related to the
expected channel delay spread and is restricted to be
within the same preamble as the corresponding delay
triplet value.
After this, final detection decisions are made at block U.

The threshold is adjusted individually to each Zadoff-Chu
base sequence (u-index) used in preambles. In other words,
the threshold is the same for all preambles derived from a
given Zadoff-Chu sequence with cyclic shifts.

The embodiment 4 aspect of the invention may be implemented as follows.
Correlate the Zadoff-Chu sequences of the received signal
with the ZC root/base sequences used in the cell.
Non-coherently combine the correlation results over multiple transmit antennas
Estimate the level for noise and interference, denoted with
$\sigma^2_{n,est}$
Tentatively detect peaks which exceed the threshold $T_{n,c}$
set up against the noise floor Go through the tentatively detected peaks one-by-one starting from the strongest peak and proceed in descending order. Perform the following steps at each iteration:

Select the larger one from the correlation values corresponding to the frequency cyclic shift pair of the peak. This is denoted with $P_{sp1}$. The correlation value for the frequency cyclic shift pair is denoted with $P_{sp2}$ and the correlation value for the considered main peak is P.

If $P_{sp1} > \alpha \sigma^2_{n,est}$, then:
Calculate a candidate threshold $\beta P \, P_{sp1}/P$
Select the candidate threshold as the threshold if it is larger than the previous one.
Remove such peaks that do not exceed new threshold from the loop.

If $P_{sp1}$ exceeds the threshold, check if other peaks are detected within +/−d delays of the same preamble. Sum the energies of all such peaks.

Repeat the above step for the considered main peak P.

Compare the summed energies of the above two steps, and remove the peaks which correspond to the smaller sum.

If main peak P was not removed in the step immediately above, repeat steps the above 'checking if other peaks are detected' step and the 'comparing summed energies' steps for $P_{sp2}$.

A preamble is detected if a corresponding peak exceeds the final threshold.

Embodiment 5

In this embodiment, correlation over a single (long) preamble sequence is done in multiple shorter sequence pieces, and the partial correlation results are combined non-coherently. In that respect, it is a hybrid of embodiments 3 and 4 above, where the different sequence segments are correlated so that each segment yields a partial correlation. Then, cyclic shift triplets are determined and compared as in embodiment 4, but this time for each peak. Specifically, in this approach:

Tentative peak detections are made.
The detected peaks are evaluated one-by-one:
for each peak the correlation values of the cyclic shift triplet are considered.
if multiple peaks are detected on the cyclic shift triplet, only the strongest is kept and the other ones are removed (see embodiment 4 above).

The use of partial correlations of different length segments of the ZC sequence, as noted above for embodiment 3, can be also exploited with this embodiment.

It should be noted that in any of the above descriptions that use thresholds for both coherently combined and non-coherently combined results, those thresholds are separate.

The approaches described above for case 1, a repeating ZC sequence, reduce false alarm rate caused by RACH transmission of high velocity terminals, while it maintains good detection properties. The additional computational complexity required by the invention is seen to be small.

One concern arises when multiple high velocity UEs/terminals transmit simultaneously different preambles which are derived from the same Zadoff-Chu base sequence. In such a case, the strongest preamble is likely detected. However, the detection probability of other preambles is reduced due to the increased threshold for non-coherently combined correlation results. In the extreme case that the parameter α of embodiment 1 is set very close to 1, only one high velocity UE can be detected. It should be noted that embodiment 2 adapts the threshold to the frequency offset whereas embodiment 1 does not. Hence the concern immediately above is less pressing for embodiment 2 than for embodiment 1.

Since the RACH preambles from low velocity terminals can be detected from the coherently combined correlation results, the concern above does not affect low velocity terminals. This kind of behavior is in-line with the E-UTRA performance requirements for high velocity terminals.

Figure 3:
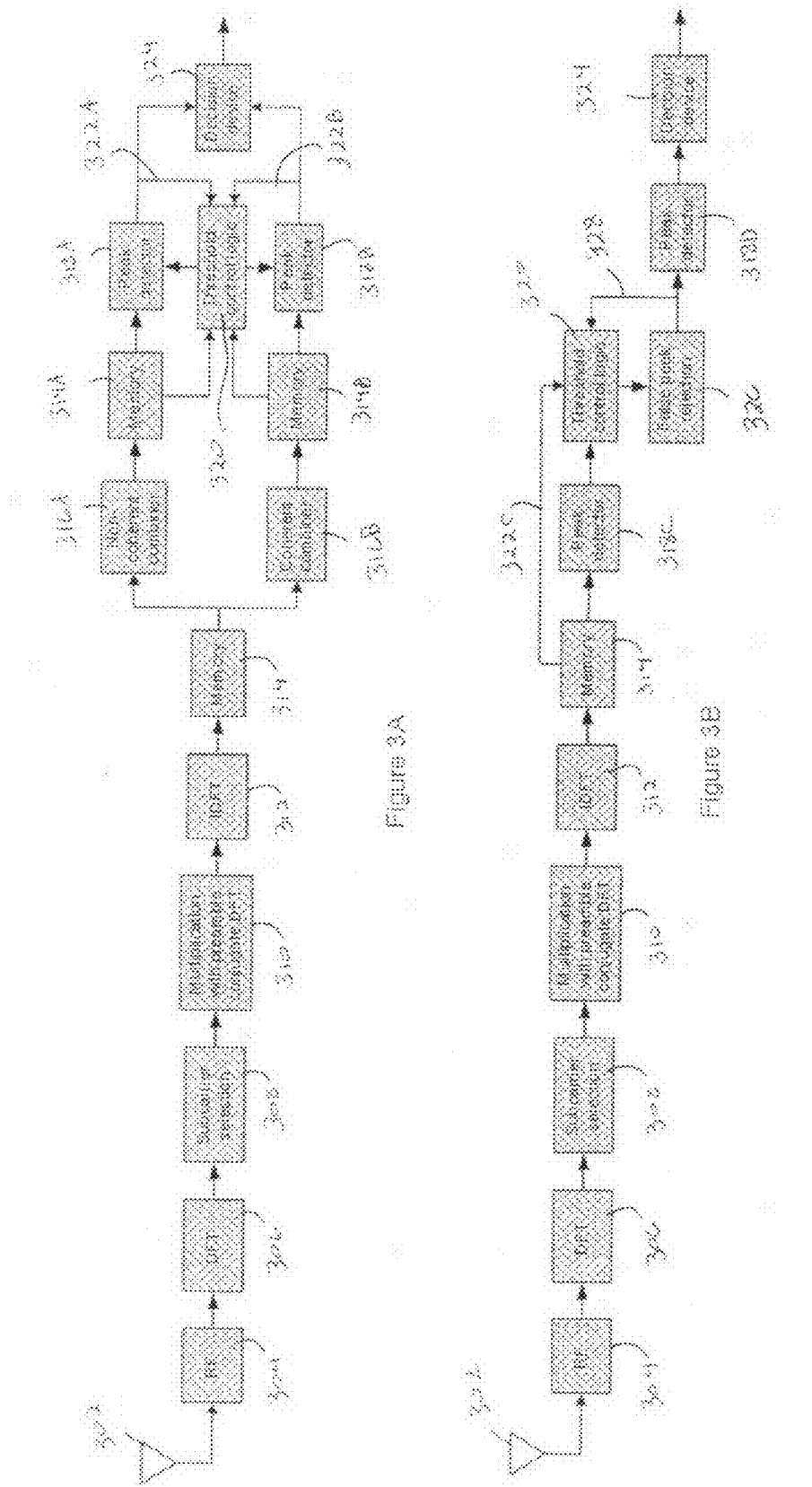
FIG. 3A is a simplified schematic block diagram of a receiver for practicing the invention.
FIG. 3B is an alternate arrangement of the receiver of FIG. 3A.

Exemplary hardware configurations for a receiver/transceiver are shown in FIGS. 3A-3B. Though only one antenna 302 is shown for each, it is recognized that a multi-antenna apparatus may be used, such as was noted above for embodiment 2. As seen in FIG. 3A, an RF section 304 amplifies and demodulates the received signal, a DFT block 306 executes a DFT so that a subcarrier can be selected at block 308. The signal is then multiplied with a conjugate of that DFT at block 310. This generates the correlation peaks. An IDFT is executed at block 312 and the results are stored at block 314. The results are coherently combined at combiner block 316B and non-coherently combined at combiner block 316A, and again stored in local memories 314B, 314A such as random access memory for fast access. From these memories 314A, 314B of the peaks is determined the thresholds at control logic block 320. Peak detectors 318A, 318B isolate the peaks and feedback 322A, 322B to the control logic in a loop to determine the largest peak. A decision logic block 324 uses AND or OR logic to decide detect/non-detect if one or both largest peaks exceed the threshold, according to certain of the embodiments above.

FIG. 3B shows hardware for implementing the staged approach. A peak detector 318C finds those peaks in the memory 314 after the correlations are executed, but a feedforward path 322C inputs directly from the memory 314 to the threshold control logic block 320. There the frequency cyclic pair is generated from the original peak in the memory 314. False peaks are rejected at logic block 326, and using the feedback 328 one peak is left for the final peak detector 318D. The decision device 324 of FIG. 3B then determines detect/not detect from that single peak rather than logically combining outputs of two peak detectors 318A, 218B as in FIG. 3A. The above apparatus are exemplary; numerous different implementations may be derived to execute the various embodiments detailed above.

Figure 6A:
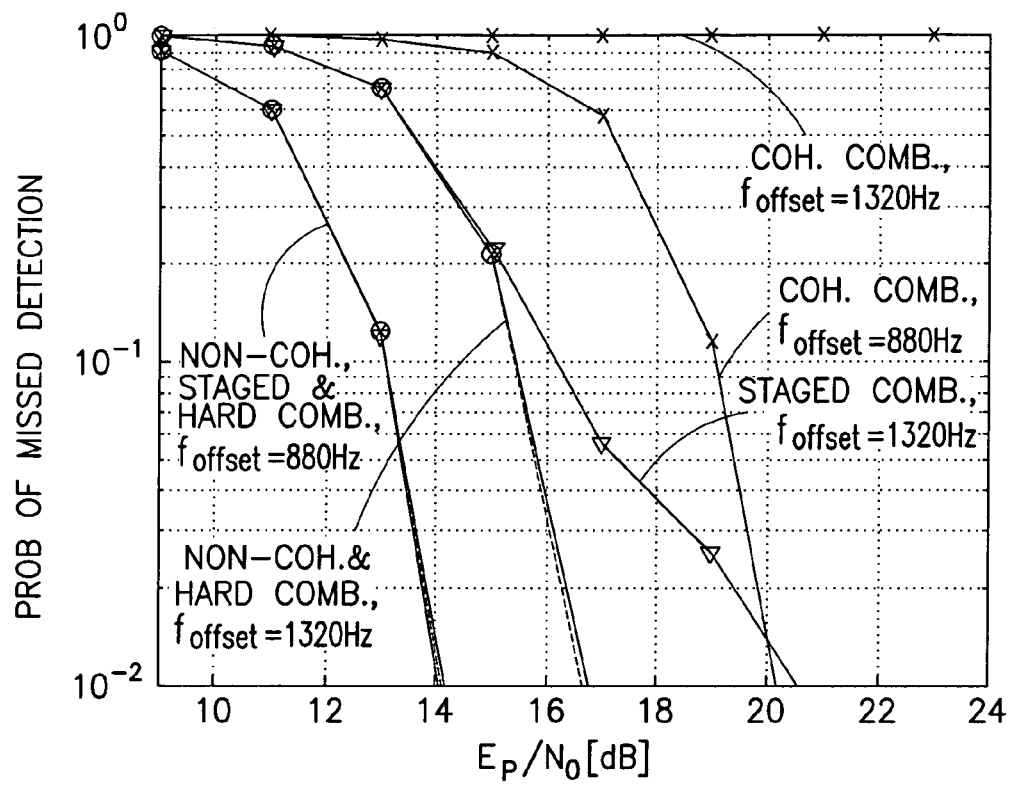
FIGS. 6A-6B are graphs showing probability of missed detection for what is detailed below as respective methods 1 and 2 of the invention, along with results for coherent and non-coherent combining as well as hard combining of coherent and non-coherent detections.
Figure 6B:
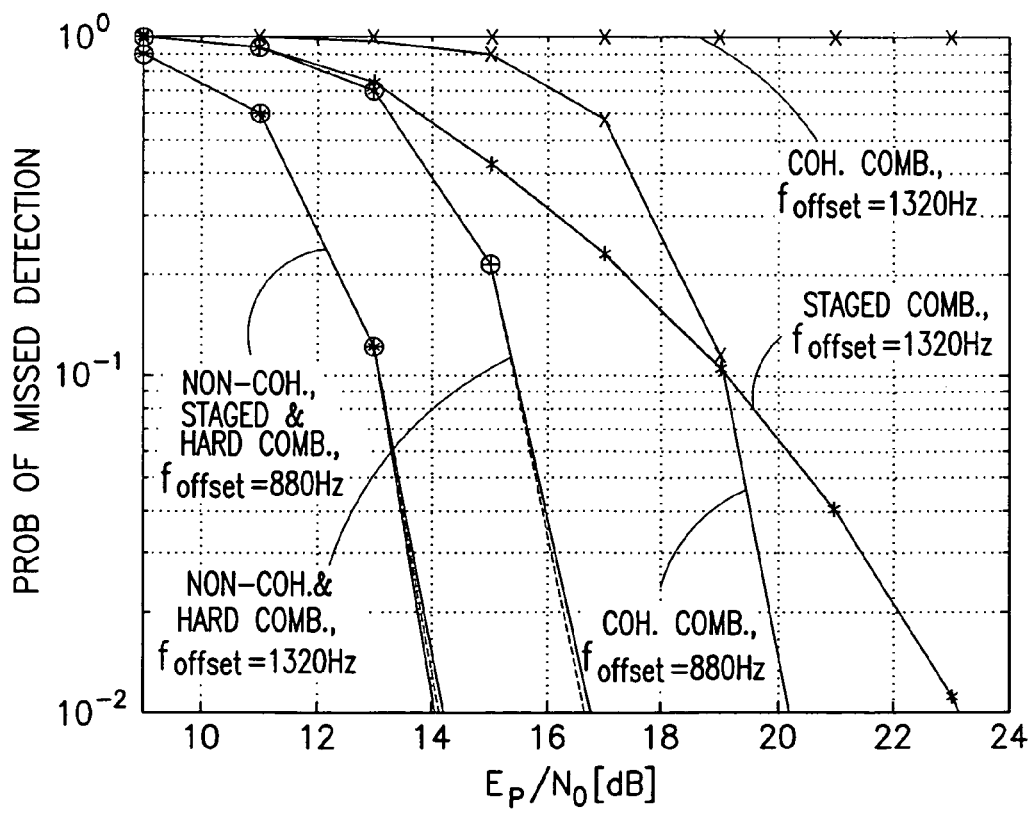
Figure 7A:
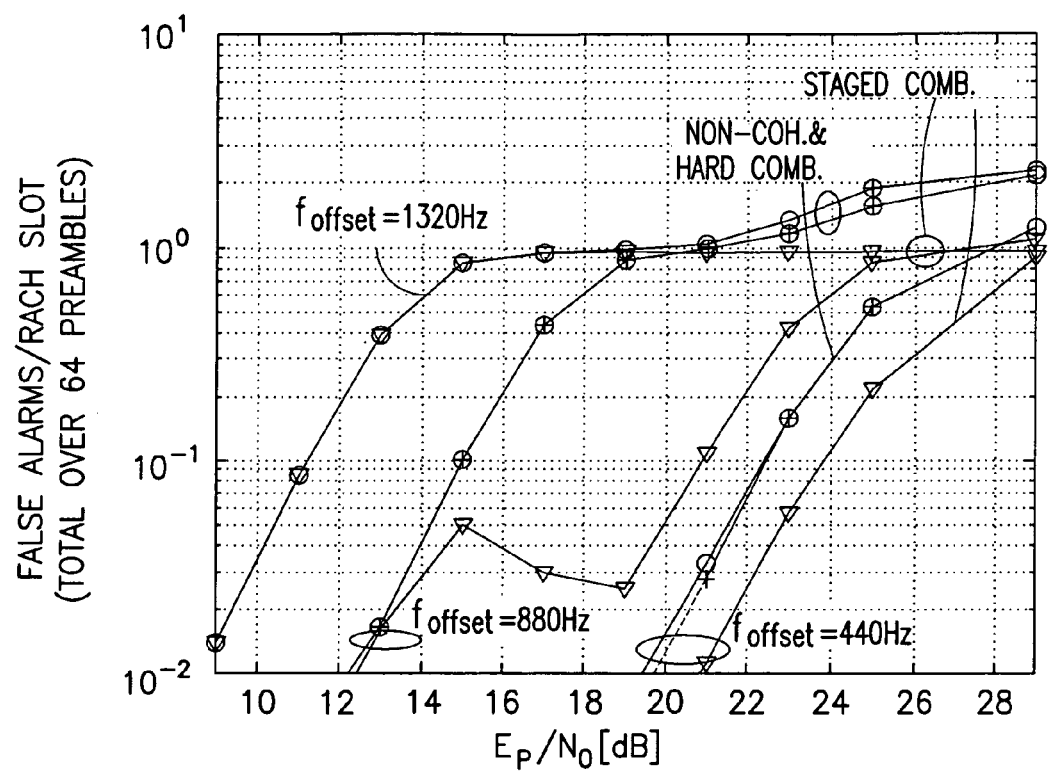
FIGS. 7A-7B are graphs showing false alarm rates for what is detailed below as respective methods 1 and 2 of the invention, along with results for coherent and non-coherent combining as well as hard combining of coherent and non-coherent detections.
Figure 7B:
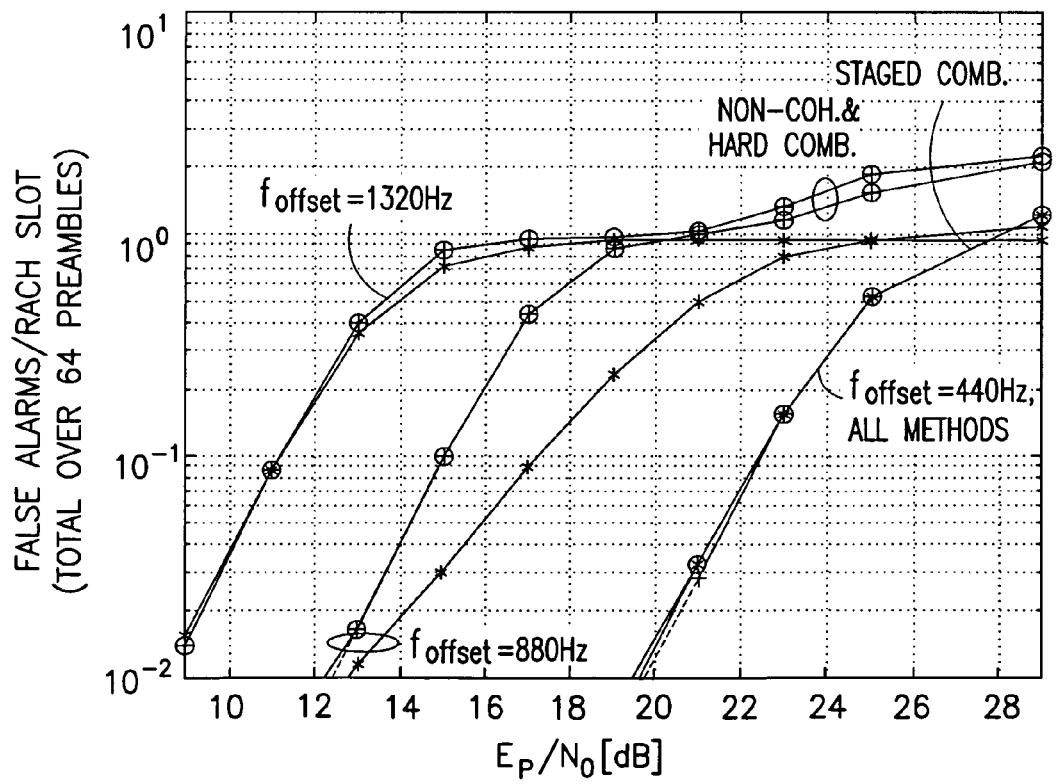

Missed detection and false alarm rates for a single 2×0.4 ms preamble transmission are presented in FIGS. 6A-B (missed detection) and 7A-B (false alarm). A simple one-path line of sight LoS channel is assumed, and frequency offset is set to twice the Doppler frequency. Thus, frequency offsets of 440 Hz, 880 Hz, and 1360 Hz correspond to 120 km/h, 240 km/h, and 360 km/h terminal velocities, respectively. A false alarm rate over 1 means that more than one preamble out of 64 are wrongly detected, on average. It should be noted that the algorithms are exemplary and are not optimized. For example, the detection probability of embodiment 2 in FIG. 6B can be improved to that of embodiment 1 in FIG. 6A by combining the embodiments.

The presented embodiments reduce false alarm rates caused by RACH transmission of high velocity terminals. Embodiments 3 and 5 also improve the detection probabilities for the high velocity RACH transmissions.

Embodiments of this invention are most advantageously disposed in a receiver, such as a computer program embodied on a memory and executed by a DSP, field programmable gated array, application specific integrated circuit, or similar such processor. Aspects of this invention are seen as highly advantageous for use in a base station of a cell-based mobile communication network.

Based on the foregoing it should be apparent that the exemplary embodiments of this invention provide a method, apparatus and computer program product(s) to detect a preamble sequence by non-coherently combining results from correlating a preamble sequence with base/root sequences used in the cell and setting a detection threshold based on those combined results. In an embodiment, another threshold can be set based on coherently combining results from correlating the preamble sequence, and the detect/non-detect decision is based on satisfying either one of the thresholds. In an embodiment, where the preamble sequence repeats, the results that are combined are from correlating the received first instance of the CAZAC sequence and from correlating the received second instance of the CAZAC sequence. In an embodiment, most particularly for the case where the CAZAC sequence does not repeat, different segments of the CAZAC sequence, each less than the whole and not necessarily of the same length, are correlated for a partial correlation on each segment, then the segments are combined and used to set the detection threshold. In an embodiment, detection is done in stages, where the detection threshold after the first stage is adjusted based on comparing the results of non-coherent combining and coherent combining. In another embodiment, a soft decision for a received preamble sequence is made based on a tentatively detected peak from which a soft threshold is based, two additional correlation values are selected from the correlation results on the delays corresponding to the frequency cyclic shift pair of the tentatively detected peak, and the soft detection threshold is adjusted based on comparing the correlation values on the delay corresponding to the frequency cyclic shift pair of the tentatively detected peak and the tentatively detected peak [Note that the compared correlation values corresponding to the frequency cyclic shift pair are not necessarily peaks themselves]. Further, embodiments of this invention include an apparatus such as a wireless receiver having various means for performing the various functions detailed above, such as means for storing the u ZC sequences, means for receiving a ZC sequence and means for correlating the received ZC sequence with at least one of the stored u ZC sequences, means for combining, means for generating the described thresholds, means for comparing, and means for determining detect or non-detect from the means for comparing.

In general, the various process flows and blocks shown in FIGS. 4-5 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN-LTE system, it should again be noted that the exemplary embodiments of this invention are not limited for use with only this one particular type of wireless communication system, and that they may be used to advantage in other wireless communication systems, and may be extended to other preamble sequences with certain autocorrelation properties, apart from CAZAC and/or ZC sequences.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
    an apparatus non-coherently combining either results from correlating a received preamble sequence with root sequences in use in a cell or results from correlating a first instance of the received preamble sequence and a second instance of the received preamble sequence with root sequences in use in a cell, or results from correlating a first portion of the received preamble sequence and a second portion of the received preamble sequence, with the root sequences in a cell;
    the apparatus setting a first detection threshold based on the non-coherently combined results;
    the apparatus comparing correlation peaks from the correlating to the first detection threshold;
    the apparatus coherently combining either results from correlating the received preamble sequence with the root sequences, or results from correlating the first instance of the received preamble sequence and the second instance of the received preamble sequence with the root sequences;
    the apparatus setting a second detection threshold based on the coherently combined results; and
    the apparatus detecting the preamble sequence using the root sequences whose correlation peak exceeds either the first detection threshold or the second detection threshold.

2. The method of claim 1, further comprising the apparatus adjusting the first detection threshold based on comparing the results of the non-coherent combining and the coherent combining.

3. The method of claim 1, wherein the received preamble sequence repeats as the first instance of the received preamble sequence and the second instance of the preamble sequence.

4. The method of claim 1, wherein the received preamble sequence does not repeat and comprises the first portion and the second portion.

5. The method of claim 4 wherein the first portion and the second portion are not the same length.

6. The method of claim 1, wherein the preamble sequence comprises a constant amplitude zero autocorrelation CAZAC sequence that is received over a random access channel RACH.

7. A memory embodying a program of machine-readable instructions executable by a digital data processor to perform actions directed toward detecting a preamble sequence, the actions comprising:
non-coherently combining either results from correlating a received preamble sequence with root sequences in use in a cell, or results from correlating a first instance of the received preamble sequence and a second instance of the received preamble sequence with the root sequences in use in a cell, or results from correlating a first portion of the received preamble sequence and a second portion of the received preamble sequence with the root sequences in use in a cell;
setting a first detection threshold based on the non-coherently combined results;
comparing correlation peaks from the correlating to the first detection threshold;
coherently combining either results from correlating the received preamble sequence with the root sequences, or results from correlating the first instance of the received preamble sequence and the second instance of the received preamble sequence with the root sequences, or results from correlating the first portion of the received preamble sequence and the second portion of the received preamble sequence with the root sequences;
setting a second detection threshold based on the coherently combined results; and
detecting the preamble sequence using the root sequences whose correlation peak exceeds either the first detection threshold or the second detection threshold.

8. The memory of claim 7, wherein the preamble sequence repeats as the first instance of the received preamble sequence and the second instance of the received preamble sequence.

9. The memory of claim 7, wherein the preamble sequence does not repeat and comprises the first portion and the second portion.

10. The memory of claim 7, wherein the preamble sequence comprises a constant amplitude zero autocorrelation CAZAC sequence that is received over a random access channel RACH.

11. An apparatus comprising:
first circuitry configured to non-coherently combine either results from correlating a received preamble sequence with root sequences in use in a cell or results from correlating a first instance of the received preamble sequence and a second instance of the received preamble sequence with root sequences in use in a cell, or results from correlating a first portion of the received preamble sequence and a second portion of the received preamble sequence with the root sequences in use in a cell;
a processor adapted to set a first detection threshold based on the non-coherently combined results and to compare correlation peaks from the correlating to the first detection threshold;
second circuitry, in parallel with the first circuitry, configured to coherently combine either results from correlating the received preamble sequence with the root sequences, or results from correlating the first instance of the received preamble sequence and the second instance of the received preamble sequence with the root sequences, or results from correlating a first portion of the received preamble sequence and a second portion of the received preamble sequence with the root sequences, wherein the processor is further configured to set a second detection threshold based on the coherently combined results; and
a decision block configured to detect the preamble sequence using the root sequence whose correlation peak exceeds either the first detection threshold or the second detection threshold.

12. The apparatus of claim 11, wherein the processor comprises threshold control logic configured to adjust the first detection threshold based on comparing the results of the non-coherent combining and the coherent combining.

13. The apparatus of claim 11, wherein the received preamble sequence repeats as a first instance of the received preamble sequence and a second instance of the preamble sequence.

14. The apparatus of claim 11, wherein the preamble sequence does not repeat and comprises a first portion and a second portion.

15. The apparatus of claim 14 wherein the first portion and the second portion are not the same length.

16. The apparatus of claim 11, wherein the preamble sequence comprises a constant amplitude zero autocorrelation CAZAC sequence that is received over a random access channel RACH.

17. An apparatus comprising:
first combining means for non-coherently combining either results from correlating a received preamble sequence with root sequences in use in a cell or results from correlating a first instance of the received preamble sequence and a second instance of the received preamble sequence with root sequences in use in a cell, or results from correlating a first portion of the received preamble sequence and a second portion of the received preamble sequence with the root sequences in use in a cell;
generating means for setting a first detection threshold based on the non-coherently combined results;
comparing means for comparing correlation peaks from the correlating to the first detection threshold;
second combining means for coherently combining the results from correlating the preamble sequence with the root sequences, or results from correlating the first instance of the preamble sequence and the second instance of the received preamble sequence with the root sequences, or results from correlating a first portion of the received preamble sequence and a second portion of the received preamble sequence with the root sequences;
wherein the generating means is further for setting a second detection threshold based on the coherently combined results; and
detecting means for detecting a preamble sequence using the root sequences whose correlation peak exceeds either the first detection threshold or the second detection threshold.

18. The apparatus of claim 17, further comprising:
a local computer readable memory on which u root sequences are stored;
a wireless receiver configured to receive the preamble sequence; and a multiplier block adapted to multiply a discrete Fourier transform DFT by a conjugate of a discrete Fourier transform DFT of the preamble sequence;

wherein the combining means comprises a non-coherent combiner block;

the generating means comprises threshold control logic;

the comparing means comprises a peak detector; and the detecting means comprises a decision device that outputs a hard decision to decoding circuitry based on one of the u root sequences.

19. The apparatus of claim 17, wherein the received preamble sequence repeats as a first instance of the preamble sequence and the second instance of the received preamble sequence.

20. The apparatus of claim 17, wherein the preamble sequence does not repeat and comprises the first portion and the second portion.

21. A method comprising:

an apparatus correlating a received preamble sequence with root sequences in use in a cell and generating correlation results;

the apparatus determining a soft detection threshold based at least in part on a tentatively detected peak, wherein the tentatively detected peak which is determined based on the correlation results exceeds a threshold which is set against noise and interference;

the apparatus selecting at least two correlation values from the correlation results, wherein the selected correlation values relate to delays that correspond to a frequency cyclic shift pair of the tentatively detected peak;

the apparatus adjusting the soft detection threshold based on comparing the at least two correlation values with the delays that correspond to the frequency cyclic shift pair of the tentatively detected peak and the tentatively detected peak; and the apparatus detecting the preamble sequence based at least in part on the soft detection threshold.

22. The method according to claim 21, wherein the apparatus detecting the preamble sequence based at least in part on the soft detection threshold comprises the apparatus detecting the preamble sequence if a peak based on the corresponding correlation results exceeds the soft detection threshold.

23. A memory embodying a program of machine-readable instructions executable by a processor, the program comprising:

code for correlating a received preamble sequence with root sequences in use in a cell and generating correlation results;

code for determining a soft detection threshold based at least in part on a tentatively detected peak, wherein the tentatively detected peak which is determined based on the correlation results exceeds a threshold which is set against noise and interference;

code for selecting at least two correlation values from the correlation results on delays that correspond to a frequency cyclic shift pair of the tentatively detected peak;

code for adjusting the soft detection threshold based on comparing the at least two correlation values on the delays that correspond to the frequency cyclic shift pair of the tentatively detected peak and the tentatively detected peak; and code for detecting the preamble sequence based at least in part on the soft detection threshold;

when the computer program is run on a processor.

24. The memory according to claim 22, wherein the code for detecting the preamble sequence comprises code for detecting the preamble sequence if a peak based on the corresponding correlation results exceeds the soft detection threshold.

25. An apparatus comprising:

a memory storing a program of computer readable instructions; and at least one processor;

in which the memory and the program are configured with the at least one processor to cause the apparatus at least to:

correlate a received preamble sequence with root sequences in use in a cell and generating correlation results;

determine a soft detection threshold based at least in part on a tentatively detected peak, wherein the tentatively detected peak which is determined based on the correlation results exceeds a threshold which is set against noise and interference;

select at least two correlation values from the correlation results, wherein the selected correlation values relate to delays that correspond to a frequency cyclic shift pair of the tentatively detected peak;

adjust the soft detection threshold based on comparing the at least two correlation values with the delays that correspond to the frequency cyclic shift pair of the tentatively detected peak and the tentatively detected peak; and detect the preamble sequence based at least in part on the soft detection threshold.

26. The apparatus according to claim 25, in which the memory and the program are configured with the at least one processor to cause the apparatus to detect the preamble sequence based at least in part on the soft detection threshold by detecting the preamble sequence if a peak based on the corresponding correlation results exceeds the soft detection threshold.

* * * * *

UNITED STATES PATENT AND TRADEMARK OFFICE
CERTIFICATE OF CORRECTION

| | | |
|---|---|---|
| PATENT NO. | : 7,991,084 B2 | |
| APPLICATION NO. | : 12/008290 | |
| DATED | : August 2, 2011 | |
| INVENTOR(S) | : Hooli et al. | |

It is certified that error appears in the above-identified patent and that said Letters Patent is hereby corrected as shown below:

Claim 3, col. 15, line 3 insert --received-- in between the and preamble.

Claim 17, col. 16, line 51 insert --received-- in between the and preamble.

Claim 19, col. 17, line 12 insert --received-- in between the and preamble.

Signed and Sealed this
Seventh Day of February, 2012

David J. Kappos
*Director of the United States Patent and Trademark Office*